UNITED STATES PATENT OFFICE.

JULIUS FRAUENBERGER, OF NEW YORK, N. Y.

IMPROVEMENT IN ARTIFICIAL IVORY, CORALS, &c.

Specification forming part of Letters Patent No. 153,939, dated August 11, 1874; application filed July 3, 1874.

*To all whom it may concern:*

Be it known that I, JULIUS FRAUENBERGER, of the city, county, and State of New York, have invented a new and Improved Composition for Artificial Corals, Ivory, &c., of which the following is a specification:

My invention relates to an improved composition for manufacturing artificial corals, ivory, horn, and similar articles, in a cheap, durable, and neat manner, for various applications in the arts; and it consists of pressed caseine or curd, mixed, by exposure to heat, with a solution of copal in ammonia and alcohol, until a pasty mass is produced, which is colored as required for the different applications.

The process of preparing the composition is as follows: Two parts of fresh caseine or curd are thoroughly pressed and exposed in a closed vessel on a water-bath for about half an hour to the fire, until a uniform mass, of tough consistency, is formed. One part of a copal solution, produced by treating copal first with an ammonia solution until a thick pasty mass is formed, and then with as much alcohol of 90°, until the consistency of varnish is obtained, is added to the caseine and boiled therewith for about an hour, under continual stirring. When the mass is of uniform consistency, so as to run easily on the stirrer and harden by exposure to the air, the required color is added and thoroughly distributed therein, and the mass then spread on boards or glass plates for drying and hardening. The hardened pieces are wrapped up, previous to pressing them into the molds, in moist cloth, for taking up a small amount of moisture, and are then pressed into the molds, which have been exposed to a gentle heat previously thereto.

The articles produced with this composition, under the required degree of pressure, have nearly the same finish, color, and appearance as the genuine articles, and may, by their comparatively smaller cost of manufacture, be employed for a variety of ornamental and useful purposes.

Having thus described my invention, I claim as new and desire to secure by Letters Patent—

A composition for producing artificial corals, ivory, and similar articles, made of caseine, mixed in the proportions described and boiled under suitable heat, with a varnish-like solution of copal in concentrated liquid ammonia and alcohol, to be colored and prepared for the various applications in the arts, substantially in the manner and for the purpose set forth.

JULIUS FRAUENBERGER.

Witnesses:
PAUL GOEPEL,
T. B. MOSHER.